(12) United States Patent  (10) Patent No.: US 8,254,676 B2
Ioannou et al.  (45) Date of Patent: Aug. 28, 2012

(54) METHODS AND SYSTEMS FOR IDENTIFYING A THIN OBJECT

(75) Inventors: Dimitrios Ioannou, Fremont, CA (US); Todd Gable, Newark, CA (US)

(73) Assignee: Morpho Detection, Inc., Newark, CA (US)

( * ) Notice: Subject to any disclaimer, the term of this patent is extended or adjusted under 35 U.S.C. 154(b) by 1277 days.

(21) Appl. No.: 11/967,464

(22) Filed: Dec. 31, 2007

(65) Prior Publication Data

US 2009/0169104 A1 Jul. 2, 2009

(51) Int. Cl.
*G06K 9/00* (2006.01)
*G06K 9/56* (2006.01)

(52) U.S. Cl. .................. 382/170; 382/168; 382/308

(58) Field of Classification Search .................. 382/181, 382/170, 168, 173, 190, 191, 232, 254, 276, 382/305, 224, 308
See application file for complete search history.

(56) References Cited

U.S. PATENT DOCUMENTS

| | | | |
|---|---|---|---|
| 6,026,171 A * | 2/2000 | Hiraoglu et al. ............ | 382/100 |
| 6,035,014 A | 3/2000 | Hiraoglu et al. | |
| 6,067,366 A * | 5/2000 | Simanovsky et al. ......... | 382/100 |
| 6,075,871 A | 6/2000 | Simanovsky et al. | |
| 6,076,400 A * | 6/2000 | Bechwati et al. ............. | 73/433 |
| 6,108,396 A * | 8/2000 | Bechwati et al. ............. | 378/4 |
| 6,128,365 A | 10/2000 | Bechwati et al. | |
| 6,345,113 B1 | 2/2002 | Crawford et al. | |
| 6,421,458 B2 * | 7/2002 | Michael et al. ............... | 382/151 |
| 2006/0274066 A1 | 12/2006 | Ying et al. | |
| 2007/0014471 A1 | 1/2007 | Simanovsky et al. | |
| 2007/0014472 A1 | 1/2007 | Ying et al. | |
| 2007/0031036 A1 | 2/2007 | Naidu et al. | |

FOREIGN PATENT DOCUMENTS

| | | |
|---|---|---|
| WO | WO0042566 A1 | 7/2000 |
| WO | WO0042567 A1 | 7/2000 |

\* cited by examiner

*Primary Examiner* — Sheela Chawan
(74) *Attorney, Agent, or Firm* — Armstrong Teasdale LLP

(57) ABSTRACT

A method for identifying an object within a container is provided. The method includes acquiring image data representing an image, applying a morphological operator to the acquired image data to generate morphed image data, calculating a histogram based on the morphed image data, and classifying the image using the calculated histogram. A classification of the image may be displayed and/or stored in a computer-readable memory.

18 Claims, 4 Drawing Sheets

METHODS AND SYSTEMS FOR IDENTIFYING A THIN OBJECT

FIELD OF THE INVENTION

The embodiments described herein relate generally to identifying a shape of an object and, more particularly, to identifying the shape of an object within a container to facilitate detecting contraband concealed within the container.

BACKGROUND OF THE INVENTION

Known identification systems image a container to determine whether explosives, drugs, weapons, and/or other contraband are present within the container. Some of the known systems are configured to determine whether a thin object is present within the container. At least one known method for detecting objects in computed tomography (CT) data, including sheet-shaped objects such as sheet explosives, includes analyzing a neighborhood of voxels surrounding a test voxel and eroding the data by identifying a neighborhood of voxels surrounding a voxel of interest. In such a method, if the number of voxels having densities below a predetermined threshold exceeds a predetermined number, then it is assumed that the test voxel is a surface voxel and is removed from the object. The known method also includes applying a connectivity process to voxels to combine them into objects after sheets are detected to prevent sheets from being inadvertently removed from the data by erosion. Then a dilation function can then be performed on the eroded object to replace surface voxels removed by erosion. However, such known methods may generate false alarms because random pixels are connected and are then identified as a thin object, when no thin object exists.

Other known identification methods use density and/or atomic number to identify components of an object, but are not specifically directed to identifying a thin object.

BRIEF DESCRIPTION OF THE INVENTION

In one aspect, a method for identifying an object within a container is provided. The method includes acquiring image data representing an image, applying a morphological operator to the acquired image data to generate morphed image data, calculating a histogram based on the morphed image data, and classifying the image using the calculated histogram. A classification of the image is outputted.

In another aspect, a system for identifying an object within a container is provided. The system includes a data collection system and a detection classification system, wherein the detection classification system is coupled to the data collection system. The detection classification system is configured to acquire image data representing an image, apply a morphological operator to the acquired image data to generate morphed image data, calculate a histogram based on the morphed image data, and classify the image using the calculated histogram. A classification of the image is outputted.

In still another aspect, a computer program embodied on a computer-readable medium is provided. The computer program includes a code segment that configures a processor to receive image data representing an image, apply a morphological operator to the acquired image data to generate morphed image data, calculate a histogram based on the morphed image data, and classify the image using the calculated histogram. A classification of the image is outputted.

BRIEF DESCRIPTION OF THE DRAWINGS

FIG. 1 is a block diagram of an exemplary detection classification system.

FIG. 2 is a flowchart of an exemplary embodiment of a method for classifying an object that may be used with the system shown in FIG. 1.

FIG. 3 is a flowchart of an exemplary embodiment of a morphological operation that may be used with the method shown in FIG. 2.

FIG. 4 is a flowchart of an exemplary embodiment of a classification operation that may be used with the method shown in FIG. 2.

DETAILED DESCRIPTION OF THE INVENTION

Figure 1:
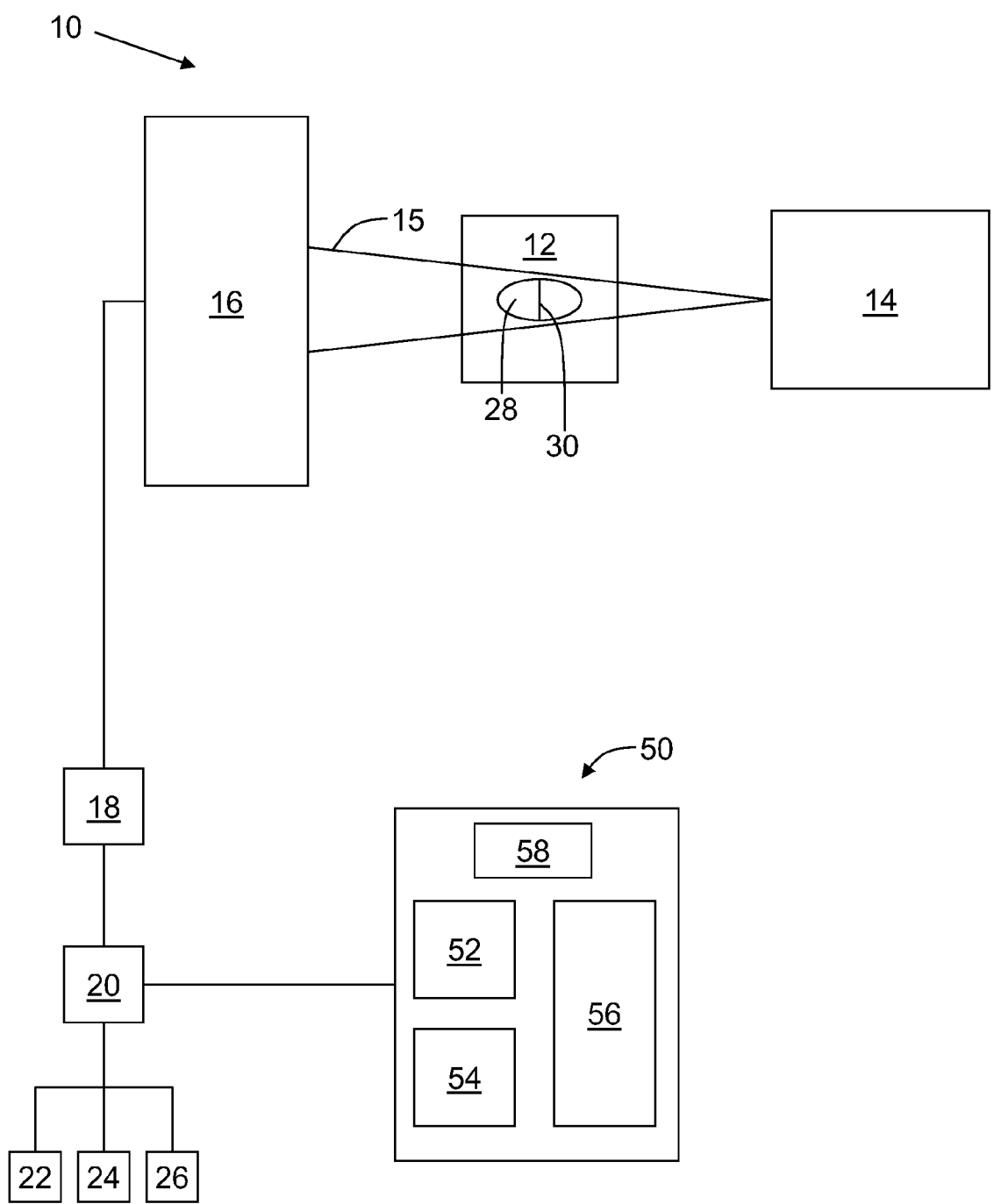
FIGS. 1-4 show exemplary embodiments of the systems and methods described herein. The embodiments shown in FIGS. 1-4 and described by reference to FIGS. 1-4 are exemplary only.

The embodiments described herein provide systems and methods for processing the output of an imaging system that includes a detection and/or classification component, and for determining whether a bulk object includes a thin object. In one embodiment, a detection classification system receives images from an imaging system. Using image elements making up the images, the detection classification system classifies one or more segments of each object as a thin object, a bulk object, or a sheet-like object. As used herein, the term "thin object" may be used interchangeably with "sheet" and refers to an object having opposing surfaces that are separated by a relatively small thickness, especially by comparison to the length and/or width of the object. Further, as used herein, the term "sheet-like" may be used interchangeably with "random object" and refers to a random aggregation of pixels and/or voxels that appears to have the characteristics of a thin object, but does not represent a physical object. Moreover, as used herein, the term "bulk object" refers to an object having a distinct mass or portion of matter, especially a large one, such that a bulk object is a main or greater object within a container. A bulk object does not have one dimension that is relatively much smaller than other dimensions of the bulk object. Further, a bulk object may represent more than one physical object. For example, a bulk object may represent a plurality of sticks of an explosive material.

For example, a book is included within a container, and the book includes therein explosives configured to be inserted into the book such that the explosives appear to be a page in the book. In the example, the book is a bulk object, the explosives are a thin object, and, if another object having sheet-like properties appears to be imaged, those pixels and/or voxels form a sheet-like object. The objects identified as thin objects may be further processed to determine if explosives, drugs, weapons, and/or other contraband is present within a container.

A technical effect of the systems and methods described herein is to reduce the occurrence of false alarms by discriminating the shape of a detected object and/or to recognize a thin object within a container. An embodiment of a method uses a morphological operator and a histogram-based descriptor to identify sheet-like shapes and classify the shapes as thin objects or sheet-like objects. Embodiments of the systems and methods described herein may be used to avoid false alarms associated with sheet-like shapes, such as random aggregations of voxels and/or pixels, by discriminating between thin objects and sheet-like objects.

At least one embodiment of the present invention is described below in reference to its application in connection with and operation of a system for inspecting cargo. However, it should be apparent to those skilled in the art and guided by the teachings herein provided that the invention is likewise applicable to any suitable system for scanning cargo containers including, without limitation, crates, boxes, drums, baggage, containers, luggage, and suitcases, transported by water, land, and/or air, as well as other containers and/or objects.

Moreover, although embodiments of the present invention are described below in reference to its application in connection with and operation of a system incorporating an X-ray computed tomography (CT) scanning system for inspecting cargo, it should apparent to those skilled in the art and guided by the teachings herein provided that any suitable radiation source including, without limitation, neutrons or gamma rays, may be used in alternative embodiments. Further, it should be apparent to those skilled in the art and guided by the teachings herein provided that any scanning system may be used that produces a sufficient number of pixels and/or voxels to enable the functionality of the detection classification system described herein.

FIG. 1 is a block diagram of an exemplary detection classification system 50 used with an X-ray computed tomography (CT) scanning system 10 for scanning a container 12, such as a cargo container, box, parcel, luggage, or suitcase, to identify the contents and/or determine the type of material contained within container 12. The term "contents" as used herein refers to any object and/or material contained within container 12 and may include contraband.

In one embodiment, scanning system 10 includes at least one X-ray source 14 configured to transmit at least one primary beam 15 of radiation through container 12. In an alternative embodiment, scanning system 10 includes a plurality of X-ray sources 14 configured to emit radiation of different energy distributions. Alternatively, each X-ray source 14 is configured to emit radiation of selective energy distributions, which can be emitted at different times. In a particular embodiment, scanning system 10 utilizes multiple-energy scanning to obtain an attenuation map for container 12. In addition to the production of CT images, multiple-energy scanning enables the production of density maps and atomic number of the object contents. In one embodiment, the dual energy scanning of container 12 includes inspecting container 12 by scanning container 12 at a low energy and then scanning container 12 at a high energy. The data is collected for the low-energy scan and the high-energy scan to reconstruct the CT, density, and/or atomic number images of container 12 to facilitate identifying the type of material within container 12 based on the material content of container 12 to facilitate detecting contraband concealed within container 12, as described in greater detail below.

In one embodiment, scanning system 10 also includes at least one X-ray detector 16 configured to detect radiation emitted from X-ray source 14 and transmitted through container 12. X-ray detector 16 is configured to cover an entire field of view or only a portion of the field of view. Upon detection of the transmitted radiation, X-ray detector 16 generates a signal representative of the detected transmitted radiation. The signal is transmitted to a data collection system and/or processor as described below. Upon detection of the transmitted radiation, each X-ray detector element generates a signal representative of the detected transmitted radiation. The signal is transmitted to a data collection system and/or processor as described below. Scanning system 10 is utilized to reconstruct a CT image of container 12 in real time, non-real time, or delayed time.

In one embodiment of scanning system 10, a data collection system 18 is operatively coupled to and in signal communication with X-ray detector 16. Data collection system 18 is configured to receive the signals generated and transmitted by X-ray detector 16. A processor 20 is operatively coupled to data collection system 18. Processor 20 is configured to produce or generate one or more images of container 12 and its contents and to process the produced image(s) to facilitate determining the material content of container 12. More specifically, in one embodiment, data collection system 18 and/or processor 20 produces at least one attenuation map based upon the signals received from X-ray detector 16. Utilizing the attenuation map(s), at least one image of the contents is reconstructed and a CT number, a density, and/or an atomic number of the contents is inferred from the reconstructed image(s). Based on these CT images, density and/or atomic maps of container 12 can be produced. The CT, density, and/or atomic number images are analyzed to infer the presence of contraband, including, without limitation, explosives and/or explosive materials.

In alternative embodiments of scanning system 10, one processor 20 or more than one processor 20 may be used to generate and/or process the container image(s). In the exemplary embodiment, scanning system 10 also includes a display device 22, a memory device 24 and/or an input device 26 operatively coupled to data collection system 18 and/or processor 20. As used herein, the term "processor" is not limited to only integrated circuits referred to in the art as a processor, but broadly refers to a computer, a microcontroller, a microcomputer, a programmable logic controller, an application specific integrated circuit and any other programmable circuit. The processor 20 may also include a storage device and/or an input device, such as a mouse and/or a keyboard.

During operation of an embodiment of scanning system 10, X-ray source 14 emits X-rays in an energy range, which is dependent on a voltage applied by a power source to X-ray source 14. A primary radiation beam 15 is generated and passes through container 12, and X-ray detector 16, positioned on the opposing side of container 12, measures an intensity of primary radiation beam 15.

Images generated by scanning system 10 are then processed by detection classification system 50 to determine whether container 12 includes suspected contraband. More specifically, detection classification system 50 uses the data within the images to identify objects 28 and/or 30 within container 12 as a thin object, a bulk object, or a sheet-like object. In the exemplary embodiment, detection classification system 50 includes one or more processors 52 electrically coupled to a system bus (not shown). Detection classification system 50 also includes a memory 54 electrically coupled to the system bus such that memory 54 is communicatively coupled to processor 52. Detection classification system 50 also includes a display device 58, which may be, but is not limited to being, a monitor (not shown), a cathode ray tube (CRT) (not shown), a liquid crystal display (LCD) (not shown), and/or any other suitable output device that enables system 50 to function as described herein. Detection classification system 50 may also include a storage device and/or an input device, such as a mouse and/or a keyboard. In the exemplary embodiment, the results of detection classification system 50 is output to a memory, such as memory 54, a drive (not shown), a display device, such as display device 58, and/or any other suitable component.

Figure 2:
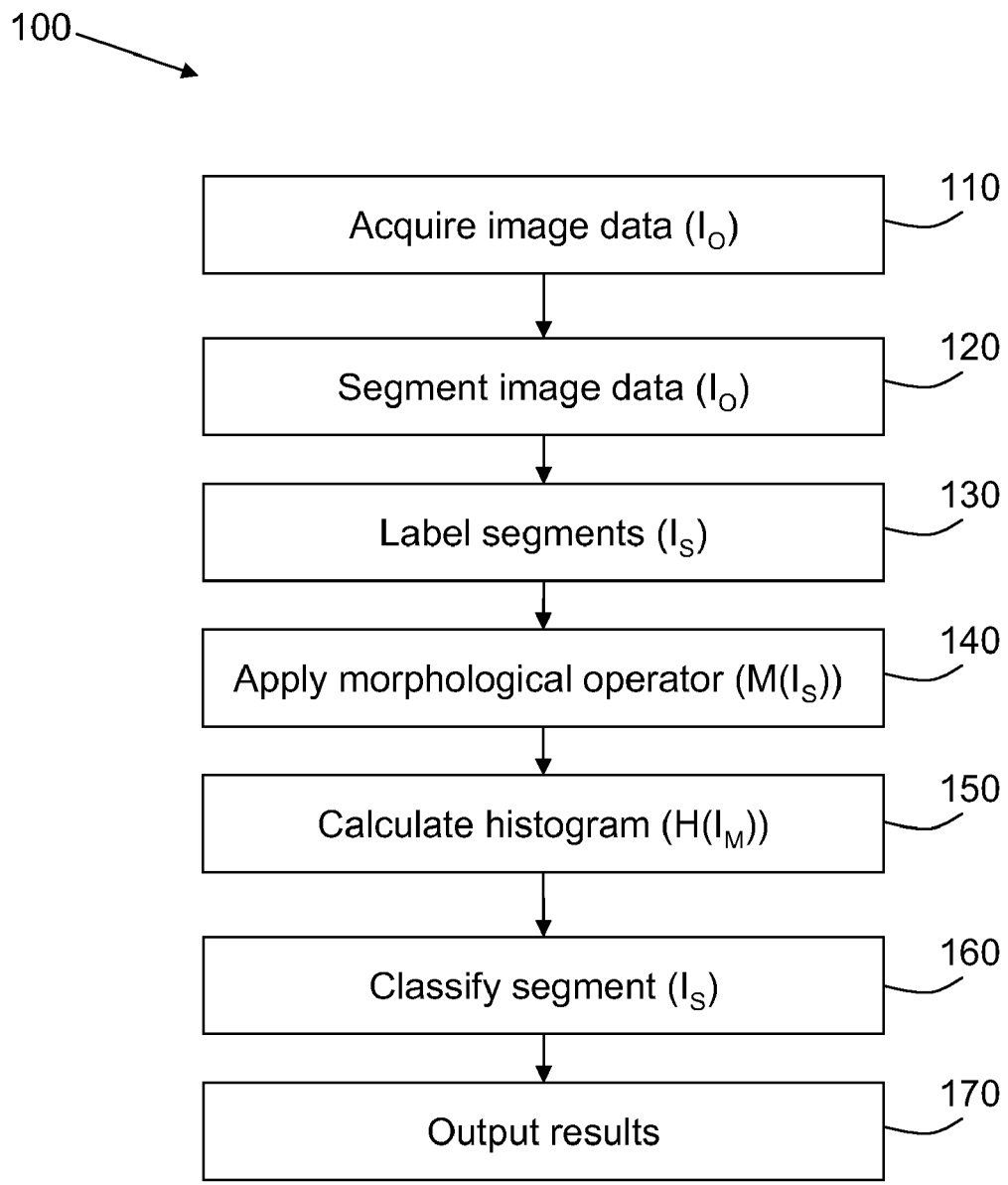

FIG. 2 shows a flowchart illustrating a method 100 for classifying object 28 and/or 30 (shown in FIG. 1) as a sheet object using detection classification system 50 (shown in FIG. 1). In the exemplary embodiment, method 100 is implemented on system 10 and/or system 50, however, method 100 is not limited to implementation on system 10 and/or system 50, and rather, method 100 may be embodied on a computer readable medium as a computer program, and/or implemented and/or embodied by any other suitable means. The computer program may include a code segment that, when executed by a processor, configures the processor to perform one or more of the function of method 100.

Furthermore, the results of method 100 are output 170 to a memory, such as memory 54 (shown in FIG. 1), a drive (not shown), a display device, such as display device 58 (shown in FIG. 1), and/or any other suitable component. In one embodiment, a classification of object 28 and/or 30 is output 170 such that the classification is displayed to an operator and/or stored in computer-readable memory. Although the method 100 is described as being used with a three-dimensional image including voxels, the method 100 may also be used with a two-dimensional image including pixels. As used herein, the term "image element" refers to an element, such as a pixel and/or a voxel, within image data.

In the exemplary embodiment, detection classification system 50 (shown in FIG. 1) receives original image data $I_O$ acquired 110 by scanning system 10 (shown in FIG. 1). The original image data $I_O$ represents an image of an object, such as container 12 (shown in FIG. 1), that has been scanned by scanning system 10. Original image data $I_O$ is segmented 120 into a plurality of image segments $I_S$. After original data $I_O$ is segmented 120, each image segment $I_S$ is labeled 130. In the exemplary embodiment, each image segment $I_S$ is labeled 130 as either a bulk object image segment $I_B$ or a thin object image segment $I_T$. In another embodiment, at least the image segments $I_S$ that may represent a thin object are labeled 130 and a thin object image segment $I_T$. In one embodiment, a plurality of bulk object image segments $I_{B1}$-$I_{BN}$ and a plurality of thin object image segments $I_{T1}$-$I_{TN}$ are labeled 130. Such labeling facilitates identifying potentially suspect regions within a container. In alternative embodiments, the original image data $I_O$ is not segmented 120 and/or labeled 130, but rather, the original image data $I_O$ is used for the following steps 140, 150, and 160.

After labeling 130, in the exemplary embodiment, a morphological operator $M(I_S)$ is applied 140 to each thin object image segment $I_T$ to generate a morphed image segment $I_M$ of the object image segment $I_T$. In an alternative embodiment, the morphological operator $M(I_S)$ is applied 140 to bulk object image segments $I_B$ and/or thin object image segments $I_T$. In the exemplary embodiment, the morphological operator $M(I_S)$ is an averaging filter, as described in more detail herein. In an alternative embodiment, the morphological operator $M(I_S)$ is any suitable operator that enables method 100 to function as described herein. The morphological operator $M(I_S)$, in the exemplary embodiment, is applied 140 to each image element, such as a pixel and/or a voxel, within the image data of the image segment $I_S$. In the exemplary embodiment, a histogram $H(I_M)$ is then calculated 150 from the morphed image segment $I_M$.

In the exemplary embodiment, memory 54 (shown in FIG. 1) includes pre-stored segment signatures $I_{SIG}$. More specifically, in the exemplary embodiment, each segment signature $I_{SIG}$ represents a histogram $H_B$ of a known bulk object, a histogram $H_T$ of a known thin object, and/or a histogram $H_R$ of a known random aggregation of voxels. The segment signatures $I_{SIG}$ are used by a classification operator C to classify 160 the image segment $I_S$ based on the calculated histogram $H(I_M)$, as described in more detail herein. More specifically, classification operator C classifies 160 each image segment Is as a bulk object $O_B$, a thin object $O_T$, or a random aggregation of voxels $O_R$. As used herein, "random aggregation of voxels" and/or "random object" refers to a segment of voxels within the acquired original image data $I_O$ that appears to represent a physical object but no such physical objects exists.

In one embodiment, an image segment $I_S$ that was labeled 130 as a thin object image segment $I_T$ is classified as a thin object $O_T$ or a random object $O_R$ by using method 100. Further, by using method 100, an object 30 (shown in FIG. 1) is separated from the contents within container 12 and is labeled 130 and classified 160 as a thin object $O_T$ that may be contraband, within container 12. In one embodiment, the thin object $O_T$ is processed further to determine whether the thin object $O_T$ is an explosive material and/or a narcotic material. In an alternative embodiment, steps 140, 150, and 160 are performed separately for each labeled bulk object image segment $I_{B1}$-$I_{BN}$ and/or each labeled thin object image segment $I_{T1}$-$I_{TN}$ in the acquired original image data $I_O$. More specifically, at least each labeled thin object image segment $I_{T1}$-$I_{TN}$ is classified 160 as a bulk object $O_B$, a thin object $O_T$, or a random object $O_R$. In the exemplary embodiment, method 100 identifies object 30 (shown in FIG. 1) as a thin object $O_T$ and object 28 (shown in FIG. 1) as a bulk object $O_B$, for example.

Figure 3:
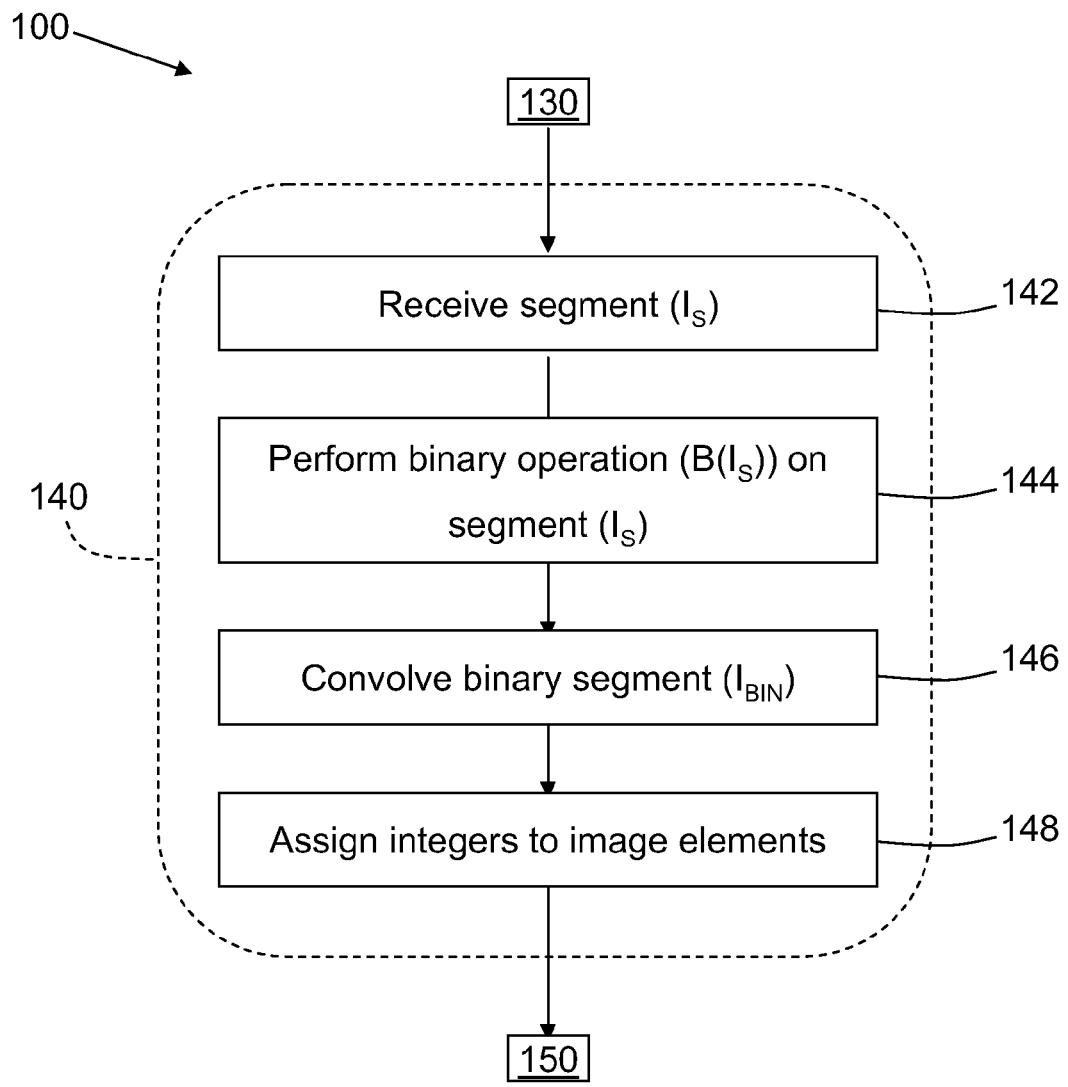

FIG. 3 is a flowchart of an exemplary embodiment of the application 140 of the morphological operator $M(I_S)$ in method 100.

In the exemplary embodiment, the labeled thin object image segments $I_T$ and/or the labeled bulk object image segments $I_B$ are received 142 by the morphological operator $M(I_S)$. More specifically, each image segment $I_S$ labeled as a thin object image segment $I_T$ is received 142 by the morphological operator $M(I_S)$. A binary operation $B(I_S)$ is performed 144 on the image segment $I_S$ to generate a binary image $I_{BIN}$ of the image segment. In the exemplary embodiment, the binary segment $I_{BIN}$ is convolved 146 using a volumetric operator, such as, for example, a three-by-three-by-three operator, wherein all coefficients are equal to one. As such, each voxel of the image segment $I_S$ is assigned 148 an integer value based on how many other voxels are in contact with and/or surrounded by the voxel of interest. In the exemplary embodiment, each voxel is assigned 148 a value between "0" and "27," and all subranges therebetween, wherein "0" indicates that no other voxels are in contact with the voxel of interest and "27" indicates that the voxel of interest is completely surrounded by other voxels. Accordingly, a bulk object will include more voxels having higher values, a thin object will include more voxels having mid-range values, and a random object will include more voxels having lower values. In the exemplary embodiment, the values assigned 148 to the voxels are used to calculate 150 the histogram $H(I_M)$ of the image segment $I_S$, wherein the histogram $H(I_M)$ includes an observed frequency for each value from "0" to "27", and all subranges therebetween.

Figure 4:
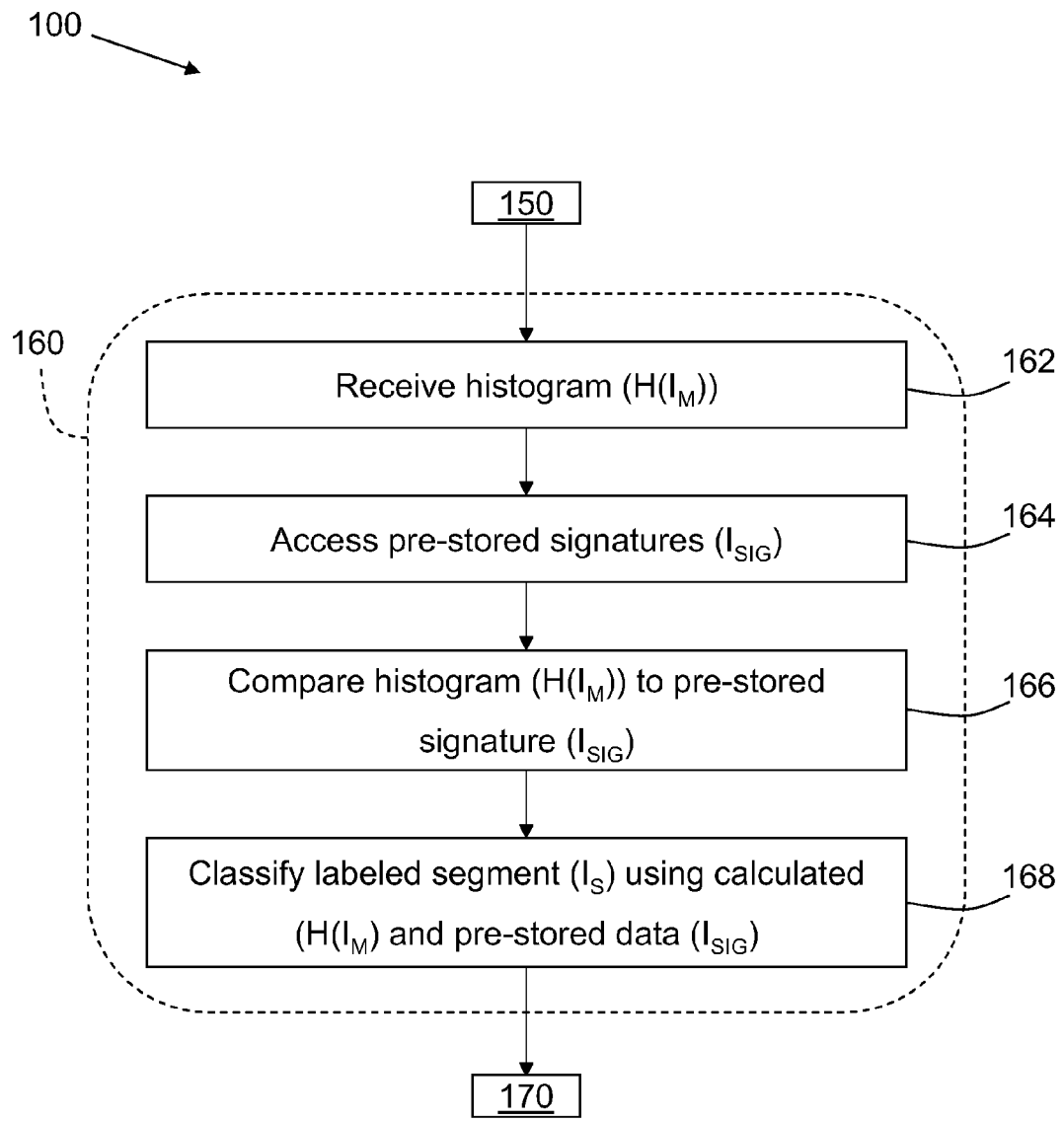

FIG. 4 is a flowchart of an exemplary embodiment of classification 160 by the classification operator C in method 100.

The histogram $H(I_M)$ is received 162 by the classification operator C. In the exemplary embodiment, the classification operator C accesses 164 the pre-stored segment signatures $I_{SIG}$, and compares 166 the received histogram $H(I_M)$ to the segment signatures $I_{SIG}$. More specifically, in the exemplary embodiment, the received histogram $H(I_M)$ is compared to the segment signatures $I_{SIG}$ to determine to which segment signature $I_{SIG}$ the histogram $H(I_M)$ is most closely analogous. In one embodiment, if the histogram $H(I_M)$ has a high frequency for the value "27," for example, the histogram $H(I_M)$ is most analogous to the segment signature $I_{SIG}$ of a bulk object, if the histogram $H(I_M)$ has a high frequency for the values between "11" and "13," for example, the histogram $H(I_M)$ is most analogous to the segment signature $I_{SIG}$ of a thin object, and if the histogram $H(I_M)$ has a high frequency for the values between "2" and "7," for example, the histogram $H(I_M)$ is most analogous to the segment signature $I_{SIG}$ of a random object or sheet-like object. Alternatively, any other suitable range and/or subrange of values is used to determine an analogous segment signature $I_{SIG}$. Based on comparison 166 between the histogram $H(I_M)$ and the pre-stored segment signatures $I_{SIG}$, the classification operator C classifies 168 the image segment $I_S$, represented by the histogram $H(I_M)$ as a bulk object $O_B$, a thin object $O_T$, or a random object $O_R$.

The above-described systems and methods for identifying a thin object facilitate improving the reliability of detecting a thin object by reducing the number of false alarms. More specifically, because the objects within a container are classified as a thin object, a bulk object, or a random object, the systems and methods identify fewer non-existent thin objects as compared to known thin object identification methods and/or systems. Further, the methods described herein enable further processing of a detected thin object to determine whether the thin object is contraband. The above-described methods provide generic, robust methods for thin structure classification for passenger luggage and/or other inspection systems. As such, the methods use a number of robust features to discriminate among thin structures, bulk structures, and sheet-like structures.

Exemplary embodiments of methods and systems for identifying a thin object are described above in detail. The methods and systems are not limited to the specific embodiments described herein, but rather, components of systems and/or steps of the methods may be utilized independently and separately from other components and/or steps described herein. For example, the methods may also be used in combination with other imaging systems and methods, and are not limited to practice with only the classification systems as described herein. Rather, the exemplary embodiment can be implemented and utilized in connection with many other identification and/or classification applications.

Although specific features of various embodiments of the invention may be shown in some drawings and not in others, this is for convenience only. In accordance with the principles of the invention, any feature of a drawing may be referenced and/or claimed in combination with any feature of any other drawing.

While the methods and systems described herein have been described in terms of various specific embodiments, those skilled in the art will recognize that the methods and systems described herein can be practiced with modification within the spirit and scope of the appended claims.

What is claimed is:

1. A method for identifying an object within a container, said method comprising:
    acquiring image data representing an image;
    applying a morphological operator to the acquired image data to generate morphed image data in which each image element of the image data is assigned an integer value representing contact with neighboring image elements;
    calculating, by a processor, a histogram based on the integer values of each image element in the morphed image data;
    classifying the image using the calculated histogram; and
    outputting a classification of the image.

2. A method in accordance with claim 1, further comprising segmenting the acquired image data into a plurality of image segments.

3. A method in accordance with claim 2, further comprising labeling each image segment of the plurality of image segments.

4. A method in accordance with claim 1, wherein applying a morphological operator further comprises performing a binary operation on the acquired image data to assign each image element a binary value.

5. A method in accordance with claim 4, wherein applying a morphological operator further comprises assigning the integer value to each image element of the acquired image data based on a binary value of an image element of interest and binary values of image elements surrounding the image element of interest.

6. A method in accordance with claim 1, wherein applying a morphological operator further comprises applying an averaging filter to the acquired image data.

7. A method in accordance with claim 1, wherein classifying the image using the calculated histogram further comprises comparing the calculated histogram to a plurality of pre-stored image signatures.

8. A method in accordance with claim 1, wherein classifying the image further comprises classifying the image as one of a bulk object, a thin object, and a random aggregation of image elements.

9. A system for identifying an object within a container, said system comprising:
    a data collection system; and
    a detection classification system coupled to said data collection system, said detection classification system configured to:
        acquire image data representing an image;
        apply a morphological operator to the acquired image data to generate morphed image data in which each image element of the image data is assigned an integer value representing contact with neighboring image elements;
        calculate a histogram based on the integer values of each image element in the morphed image data;
        classify the image using the calculated histogram; and
        output a classification of the image.

10. A system in accordance with claim 9, wherein said detection classification system is further configured to segment the acquired image data into a plurality of image segments.

11. A system in accordance with claim 10, wherein said detection classification system is further configured to label each image segment of the plurality of image segments.

12. A system in accordance with claim 9, wherein said detection classification system is further configured to perform a binary operation on the acquired image data to assign each image element a binary value.

13. A system in accordance with claim 12, wherein said detection classification system is further configured to assign the integer value to each image element of the acquired image data based on a binary value of an image element of interest and binary values of image elements surrounding the image element of interest.

14. A system in accordance with claim 9, wherein said detection classification system is further configured to apply an averaging filter to the acquired image data.

15. A system in accordance with claim 9, wherein said detection classification system is further configured to compare the calculated histogram to a plurality of pre-stored image signatures.

16. A system in accordance with claim 9, wherein said detection classification system is further configured to classify the image as one of a bulk object, a thin object, and a random aggregation of image elements.

17. A computer program embodied on a non-transitory computer-readable medium, said computer program comprising a code segment that configures a processor to:
　receive image data representing an image;
　apply a morphological operator to the acquired image data to generate morphed image data in which each image element of the image data is assigned an integer value representing contact with neighboring image elements;
　calculate a histogram based on the integer values of each image element in the morphed image data;
　classify the image using the calculated histogram; and
　output a classification of the image.

18. A computer program embodied on a non-transitory computer-readable medium in accordance with claim 17, wherein the code segment further configures the processor to:
　perform a binary operation on the acquired image data;
　apply an averaging filter to the acquired image data; and
　assign the integer value to each image element of the acquired data.

\* \* \* \* \*